Jan. 21, 1941.          R. M. NELSON          2,229,185

DRAFT GEAR CONSTRUCTION

Filed March 7, 1940

Inventor
R. M. Nelson,
By D. P. Wolhaupter
Attorney

Patented Jan. 21, 1941

2,229,185

UNITED STATES PATENT OFFICE 2,229,185

DRAFT GEAR CONSTRUCTION

Robert M. Nelson, Evanston, Ill., assignor to Peerless Equipment Company, Chicago, Ill., a corporation of Delaware Application March 7, 1940, Serial No. 322,796

3 Claims. (Cl. 213—32)

This invention relates to shock absorbing mechanisms, and has particular reference to improvements in friction shock absorbing mechanisms such as are used in draft gears of railway cars and locomotives and which comprise, generally speaking, a casing, an annular series of friction shoes therein, a follower block having wedging cooperation with said friction shoes, and spring means acting upon said shoes in a direction counter to said follower block, whereby said shoes are maintained normally expanded by said spring means in cooperation with said follower block and are acted upon expansively by said follower block in response to buffing forces imposed on the latter so as to cooperate frictionally with the casing to resist such forces.

If, in a shock absorbing mechanism of the general character stated, there are provided only two friction shoes, oppositely disposed, or only three friction shoes triangularly related to each other, each of the shoes will be caused to contact with the casing normally and also whenever buffing forces are imposed on the follower block because, in either such case, the forces acting on the shoes necessarily will be distributed between them.

If, on the other hand, a shock absorbing mechanism of the general character stated embodies more than three friction shoes, there is neither any assurance that all of the friction shoes will be maintained by the spring means sufficiently expanded normally to engage the casing, nor any assurance that all of said shoes will be expanded into engagement with the casing by the follower block in response to buffing forces imposed on the latter, in the absence of some special means to insure such engagement. On the contrary, due to manufacturing variations in the friction ways in the casing with which the friction shoes cooperate, and in the shoes themselves, as well as in the follower block and the usual spring cap between the friction shoes and the springs of the gear, it is almost impossible and, in any event, impracticable, to manufacture the parts of the mechanism with a perfection to insure engagement of all of the friction shoes with the casing normally and in response to buffing forces imposed on the follower block, in any case where the mechanism has more than three friction shoes and in the absence of some special provision to insure such engagement.

It is, however, desirable for various practical reasons which need not herein be discussed, to provide mechanism of the character mentioned with more than three friction shoes. Prior mechanisms of the character mentioned embodying more than three friction shoes have not however embodied means to insure tight engagement of all of the friction shoes with the casing at all times despite the manufacturing inequalities referred to. Consequently, in prior mechanisms of the character mentioned embodying more than three friction shoes, one or more of the shoes usually is loose, both normally and when the mechanism is operating to resist buffing forces imposed thereon. A loose shoes not only is noisy, but is conducive to accelerated wear of the shoe itself and the friction way in the casing with which it cooperates. Accordingly, the general object of the present invention is to provide, in a shock absorbing mechanism of the character mentioned embodying more than three friction shoes, means to insure engagement of all the shoes at all times with the casing, or in other words, to avoid any looseness of any one or more of the shoes at any time, whereby all of the shoes are effective to resist buffing forces with the consequence that the mechanism is highly efficient in operation and all disadvantages of a loose shoe, or shoes, are avoided.

Another object of the present invention is to provide simple, practical means for accomplishing the purpose stated.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the accompanying drawing, wherein like characters of reference denote corresponding parts in related views—

Figure 1:
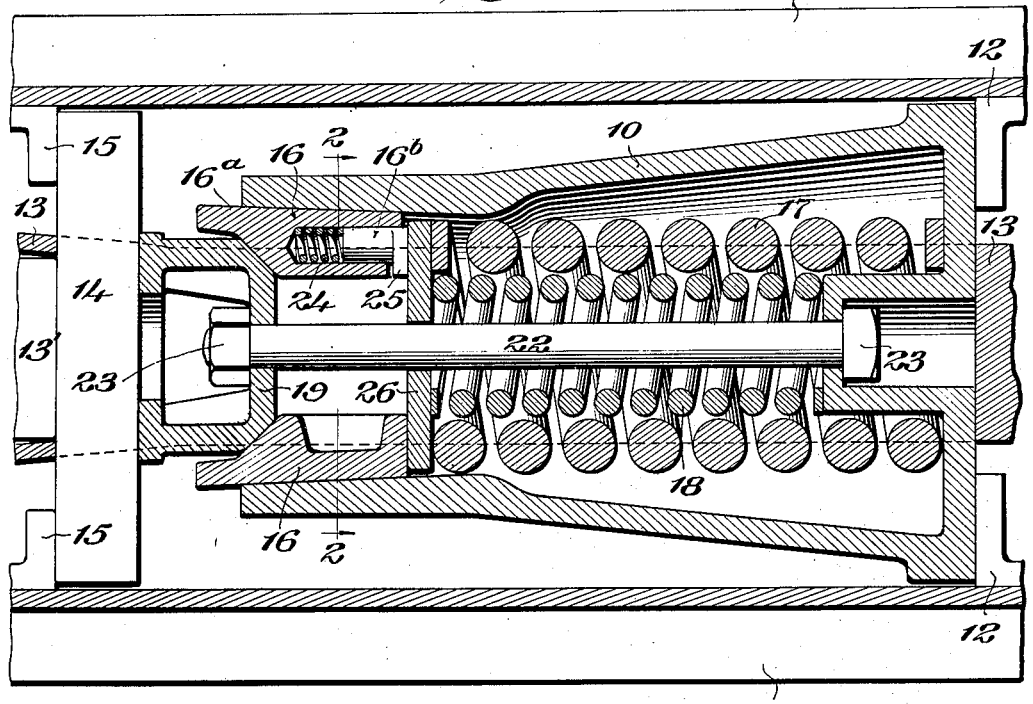
Figure 1 is a longitudinal section through a friction shock absorbing mechanism constructed in accordance with one practical embodiment of the invention.

A shock absorbing mechanism of the type with which the present invention is concerned is particularly intended and designed for use in draft gears for railway cars and locomotives. Accordingly, it will be described as embodied in a draft gear. It is pointed out, however, this is merely for convenience and is not to be construed as limiting, as some or all of the novel features of the invention may, within the purview of the invention, readily be embodied in specifically different mechanisms for various other uses.

According to the invention the mechanism comprises a casing, designated generally as 10, disposed between the draft sills 11 of a car underframe; suitable stop means such as stop lugs 12 carried by said draft sills for cooperation with said casing, either directly as shown or indirectly in any suitable manner, to hold said casing against inward movement relative to said sills; a draw-bar yoke 13 engaged, either directly as shown, or indirectly in any suitable manner, with the rear of the casing 10 and extending forwardly relative to said casing for transmitting draft forces thereto; and a main front follower 14 cooperating with spring and friction-shoe means within the casing 10 and also with suitable stop means such as other stop lugs 15 carried by the draft sills 11, for transmitting to said sills and to the car, draft forces applied to the casing 10 by the draw-bar yoke 13, all as is common and well known in the art.

Also, according to each of the illustrated embodiments of the invention, the spring and friction-shoe means referred to comprises an annular series of more than three friction shoes 16 disposed in the front end portion of the casing 10; coil springs 17 and 18 interposed between the rear of the casing 10 and the inner ends of the friction-shoes 16; and a wedge 19 interposed between the main front follower 14 and the friction-shoes 16 and having wedging cooperation with said friction-shoes.

The springs 17, 18 are under constant compression and therefore tend constantly to react from the casing 10 to urge the friction-shoes 16 forwardly relative to said casing 10 and to react from said friction-shoes to urge the casing 10 rearwardly. In other words, the springs 17, 18 tend constantly to move the casing 10 and the friction-shoes 16 longitudinally outward or to separate them relative to each other. However, rearward movement of the casing 10 is limited by the stop lugs 12 and forward movement of the shoes 16 is limited by the stop-lugs 15 in cooperation with the main front follower 14 and the wedge 19 interposed between said main front follower and the friction-shoes 16. Thus, the springs 17, 18 act normally to maintain the casing 10 at its limit of rearward movement as determined by the stop lugs 12, and to maintain the friction-shoes 16 in forward positions relative to the casing 10, as well as to maintain the main front follower 14 at its limit of forward movement as determined by the stop-lugs 15. Moreover, due to the wedging cooperation between the wedge 19 and the friction-shoes 16, the springs 17, 18 act also to expand said friction-shoes.

At its front end the casing 10 has internal friction ways 20 with which the outer faces of the friction-shoes 16 frictionally cooperate and, as shown, these friction ways converge inwardly relative to each other. Thus, when draft forces are applied by the yoke 13 forwardly upon the casing 10, said casing, in order to move forwardly relative to the friction shoes 16, must contract said friction-shoes relative to each other, because the wedge 19 is held against forward movement and holds said friction shoes against forward movement. The friction-shoes may be contracted because they are yieldably held expanded by the springs 17, 18. The shock of draft forces suddenly applied thus will be absorbed by the frictional cooperation of the friction ways 20 of the casing with the outer faces of the friction-shoes 16.

On the other hand, when buffing forces are transmitted through the coupler butt 13' to the main front follower 14 and through said follower to the wedge 19, said wedge tends both to move the friction-shoes 16 inwardly relative to the casing 10 and also to expand said shoes. Thus, the shocks of buffing forces applied to the mechanism are absorbed by the frictional cooperation of the shoes 16 with the friction ways 20 in the casing.

The wedge 19 may be directly engaged at its forward end with the main front follower 14 as shown, or there may be interposed between said wedge and said main front follower a follower block in accordance with known practice. In either case, a rod 22 preferably extends centrally through the mechanism, including the rear wall of the casing 10 and the wedge 19 and also the follower block if same is provided, and is provided rearwardly of the rear wall of said casing and forwardly of a suitable portion of said wedge 19, or forwardly of said follower block, as the case may be, with nuts 23 or other suitable stops, whereby the parts of the mechanism are held in assembly with each other and whereby forward and rearward movements of the friction shoes 16 and the casing 10 are limited.

If the mechanism comprised only two friction-shoes, oppositely disposed, or only three friction-shoes triangularly related to each other, each of the shoes would be maintained at all times engaged with the casing 10, because in either case the forces acting on the shoes necessarily would be distributed between them. It is desirable, however, for a number of reasons here not requiring discussion, to employ more than three friction shoes in a mechanism of the general type described. When, however, more than three friction shoes are used, and in the absence of special means to insure expansion of all of them into engagement with the casing 10, some one or more of the shoes in practically every case would be loose, for it is practically impossible, and in any event impracticable, to manufacture the shoes and their cooperating friction ways 20 in the casing, as well as other cooperating parts of the mechanism, with sufficient perfection so that some one or more of the shoes will not hold the wedge 19 against effective cooperation with some one or more other of the shoes.

Figure 2:
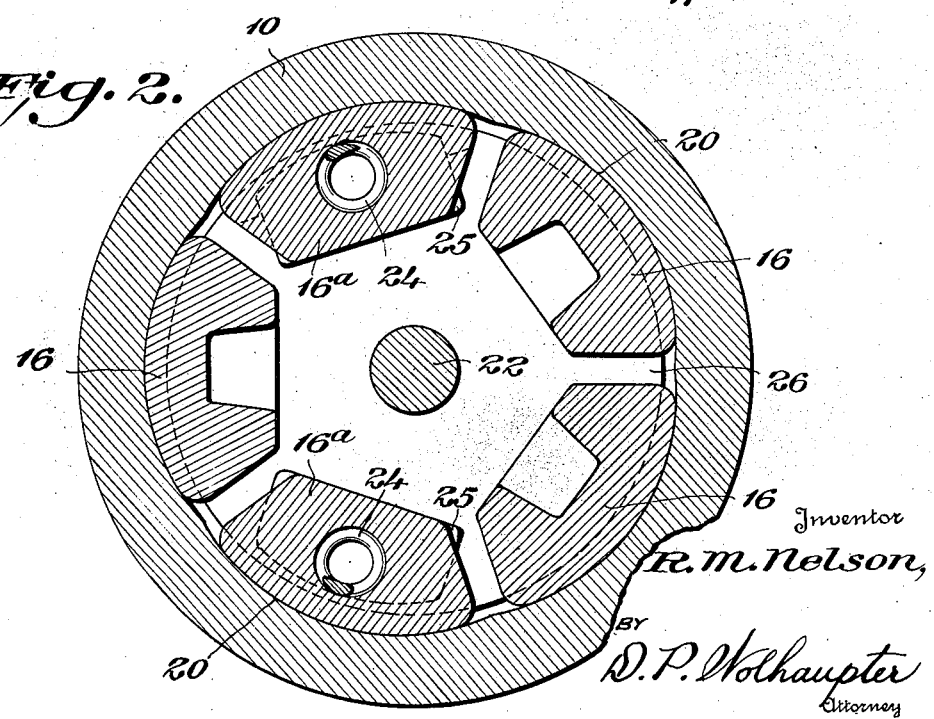
Figure 2 is a cross section on the line 2—2 of Fig. 1.

Any one or more loose friction-shoes not only produces disagreeable noise but accelerates wear resulting in its increased looseness. By a process of selective assembly it is possible to obtain gear assemblies in which all of the shoes are tightly wedged against the casing, but this involves measuring and substituting larger shoes for those that are loose and, in short, is a trial and error proposition which is very costly. Therefore, it is quite important to insure engagement of all of the shoes 16 with the wedge 19 and the friction-ways 20 both normally and especially when the mechanism is acting to absorb shocks due either to draft or buffing forces imposed thereon. In this connection and in accordance with the form of the present invention illustrated in Figs. 1 and 2, at least certain of the friction-shoes 16 are suitably formed to comprise separate, relatively movable, front and rear parts 16a, 16b, respectively, whereby their effective lengths are variable, and suitable resilient means 24, of lesser strength than the springs 17, 18, is interposed between the said parts of each shoe so as to tend constantly to separate or move them longitudinally apart. The amount of inward movement of the parts of each two-part shoe relative to each other is suitably limited. Since the springs 17, 18 are stronger than the resilient means 24 the tendency of said springs 17, 18 is to move the parts of each of the two-part shoes to their limit of inward movement relative to each other. If, however, any shoe should act as a spacer preventing said springs 17, 18 from moving the two parts of any other shoe to their limit of inward movement relative to each other, the resilient means 24 of such two-part shoe acts to separate the parts thereof until the shoe, because of its wedging cooperation with the wedge 19, is urged laterally outwardly into engagement with its related friction way 20. Thus, engagement of all of the shoes at all times with their friction-way 20 is insured.

The present mechanism is illustrated as having five friction shoes 16, and in accordance with the invention all of said shoes may be of two-part form. This, however, is not necessary, as obviously three of the shoes, disposed in triangular relationship about the center of the mechanism, may be of one-piece or non-variable-length construction, for, as aforesaid, draft and buffing forces will be distributed between such shoes and all of them will be maintained at all times tight for the same reasons that each leg of a three-leg stool always contacts with a floor. Therefore, the present invention, according to the form thereof illustrated in Figs. 1 and 2, contemplates the use of three one-piece or non-variable length shoes disposed in triangular relationship about the center of the mechanism, and a two-part construction of the two remaining shoes; or, alternatively, a two-part construction of the single remaining shoe should the mechanism include only four shoes, or a two-part construction of each remaining shoe regardless of the number in excess of three.

In the present example each two-part shoe comprises a forward part having a bore accommodating a shank portion of the rear part, and the resilient means tending constantly to separate said front and rear parts comprises an expansion coil spring in said bore, although said resilient means may comprise, for example, a block of rubber. Moreover, the rear part of each two-part shoe is headed as indicated at 25 for cooperation with the rear end of the front part of the shoe to limit inward movement of the two parts of the shoe relative to each other. The two-part shoe, or shoes, may, however, be of any other suitable construction. Furthermore, in lieu of an element such as the element 16ᵇ, the resilient means 24 might simply extend beyond the rear end of the element 16ᵃ.

At their inner or rear ends all of the shoes 16 engage a spring cap 26 through which the springs 17, 18 act upon said shoes. In this connection, while two springs 17, 18 are shown, only one such spring or any additional number of such springs obviously may be used if desired.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a friction shock absorbing mechanism, a casing, an annular series of more than three friction-shoes therein, a main front follower, a wedge associated with said main front follower and having shoe expanding wedging cooperation with said friction-shoes, spring means reacting from said casing forwardly upon said friction-shoes, certain of said shoes and at least each of them in excess of three being of variable effective length, and resilient means of lesser strength than said spring means tending constantly to increase the effective length of each variable-length shoe, whereby expansion of all of said shoes at all times into engagement with said casing is insured regardless of inequalities in said shoes and in the portions of the casing with which they cooperate.

2. In a friction shock absorbing mechanism, a casing, an annular series of more than three friction-shoes therein, a main front follower, a wedge associated with said main front follower and having shoe expanding wedging cooperation with said friction-shoes, spring means reacting from said casing forwardly upon said friction-shoes, certain of said shoes and at least each of them in excess of three comprising separate front and rear telescopically engaged parts movable relative to each other to vary the effective length of the shoe, and resilient means of lesser strength than said spring means interposed between the parts of each such shoe and tending constantly to separate the parts thereof and thus increase the effective length of the shoe, whereby expansion of all of said shoes at all times into engagement with said casing is insured regardless of inequalities in said shoes and in the portions of the casing with which they cooperate.

3. In a friction shock absorbing mechanism, a casing, an annular series of more than three friction-shoes therein, shoe expanding wedge means and spring means acting, respectively, upon opposite end portions of said shoes, said shoes in excess of three comprising parts movable longitudinally relative to each other, and resilient means separate from said spring means tending constantly to longitudinally separate the parts of each last mentioned shoe.

ROBERT M. NELSON.